G. H. Meeker,
Riding Saddle.
No. 2,394. Reissued Nov. 13, 1866.
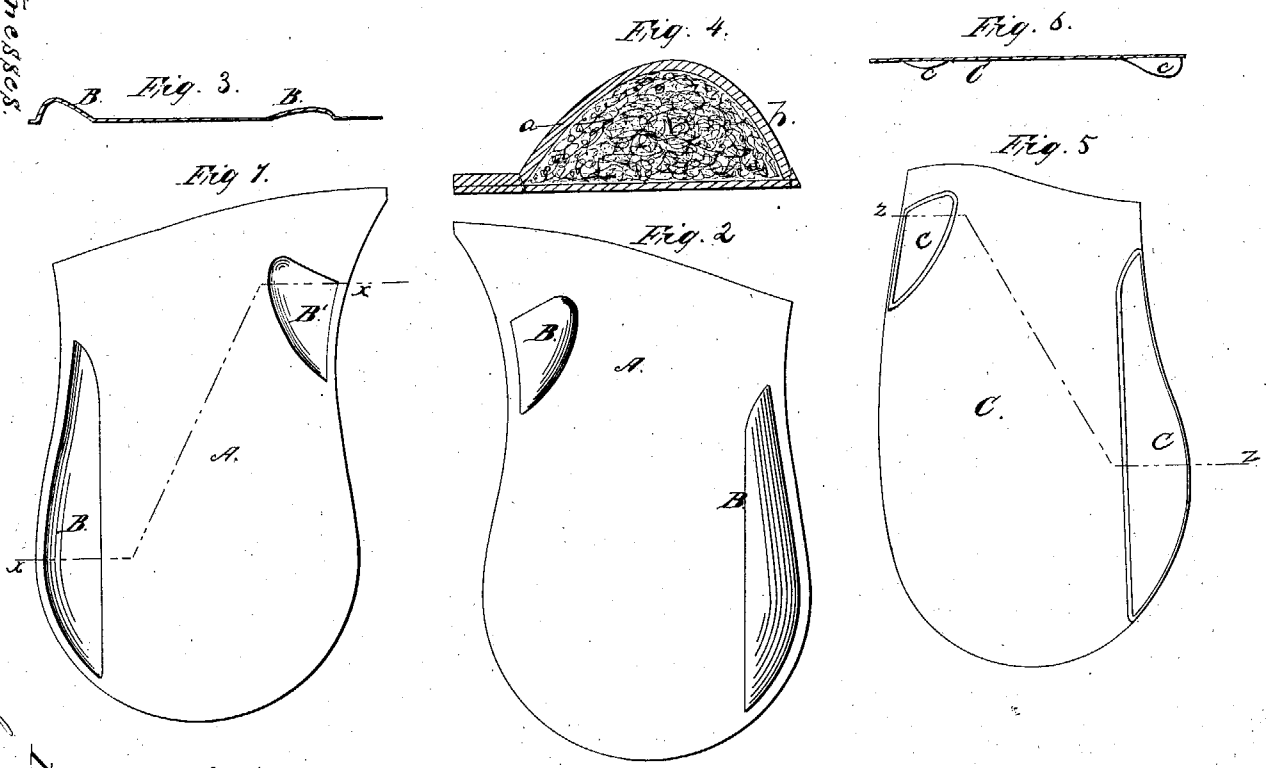
Witnesses.
Thos Tuck
Wm Freeman
Inventor:
Geo H Meeker
By Munn & Co
Attys
N. PETERS, PHOTO-LITHOGRAPHER, WASHINGTON, D. C.

UNITED STATES PATENT OFFICE.

LACEY, MEEKER & CO., OF NEW YORK, N. Y., ASSIGNEES OF GEORGE H. MEEKER.

IMPROVEMENT IN RIDING-SADDLES.

Specification forming part of Letters Patent No. 47,771, dated May 16, 1865; Reissue No. 2,394, dated November 13, 1866.

*To all whom it may concern:*

Be it known that GEORGE H. MEEKER, of Bridgeport, in the county of Fairfield and State of Connecticut, invented a new and useful Improvement in Riding-Saddles; and we, R. B. LACEY, JOHN B. MEEKER, H. T. SHELTON, and GEORGE H. MEEKER, doing business in the city of New York, assignees of GEORGE H. MEEKER, aforesaid, do hereby declare that the following is a full, clear, and exact description thereof, which will enable others skilled in the art to make and use the same, reference being had to the accompanying drawings, forming part of this specification, in which—

Figure 1 is an inner side view of the skirt of a saddle constructed according to my invention. Fig. 2 is an exterior view of the same; Fig. 3, a section of Fig. 1, taken in the line *x x;* Fig. 4, a section of a portion of Fig. 2, taken in the line *y y;* Fig. 5, an exterior side view of the lining of a saddle-skirt construction on the present plan; Fig. 6, a section of Fig. 5, taken in the line *z z*.

Similar letters of reference indicate like parts.

This invention relates to an improvement in the construction of that class of riding-saddles which have their skirts provided with projections to partially support the calves of the legs and thighs. These projections have been hitherto made by pads attached to an inner skirt or lining, and covered by pig-skin—a rather expensive mode of manufacture.

The invention consists in forming the projections by swaging the leather skirts, as hereinafter fully shown and described, whereby the labor and expense of forming the projections by pads attached to the skirts in the usual way is avoided.

A represents the leather skirt of the right side of a gentleman's riding-saddle. This skirt is cut out of a good quality of thick leather, and has projections B B′ formed on its exterior by means of swaging, the leather being in a moistened state while being swaged.

In Fig. 1 the inner side of the skirt and consequently the cavities formed by the swaging are shown, and in Fig. 2 the projections or convex surfaces are shown, B being the calf projection and B′ the thigh projection. These cavities are filled with sawdust *a*, or other suitable material, and covered at the inner side of the skirt by leather B, as shown in Fig. 4.

Figs. 5 and 6 show the present mode of constructing or forming the projections.

C represents the lining or inner leather of the skirt, and to this lining or inner leather there are secured by stitching stuffed pads *c c*, corresponding to the form of the projections B B′. These stuffed pads *c c* are then covered by pig-skin, which forms the exterior surface of the skirt.

It will be seen at once that by my improvement the projections B B′ are obtained at a much less expense than attends the present mode of manufacture.

The pig-skin is avoided, which is an expensive article, and the projections may be formed by swaging at a much less cost than by the stuffed pads, the labor of making the same and attaching them to the inner bottom of the skirt and the stitching of the pig-skin over them being considerable.

By the term "swaging" is meant the striking up or embossing of the leather between dies, or by other suitable means, so as to form the projections on the skirt out of the same piece of leather of which each skirt is composed, and of the full thickness of the same.

This invention, it will be understood, is applicable either to ladies' or gentlemen's saddles.

We claim as new and desire to secure by Letters Patent—

The forming of the projections or calf and thigh supports on the skirts of a riding-saddle by means of swaging, striking up, or embossing, substantially in the manner as herein shown and described.

JOHN B. MEEKER.
R. B. LACEY.
GEO. H. MEEKER.
HENRY T. SHELTON.

Witnesses to signature of John B. Meeker:
E. P. HINCKS,
GEO. L. WRIGHT.

Witnesses to signatures of R. B. Lacey, G. H. Meeker, and H. T. Shelton:
WYLLYS LYON,
GARRITT D. BROWNE.